United States Patent [19]

Shoemaker et al.

[11] Patent Number: 4,811,771
[45] Date of Patent: Mar. 14, 1989

[54] AERODYNAMIC PROFILE TIRE

[75] Inventors: Paul S. Shoemaker, Stow; John D. Kelley, Jr., Akron, both of Ohio

[73] Assignee: General Tire, Inc., Akron, Ohio

[21] Appl. No.: 141,456

[22] Filed: Jan. 7, 1988

[51] Int. Cl.$^4$ .............................................. B60C 03/04
[52] U.S. Cl. .................................. 152/454; 152/379.3
[58] Field of Search ..................... 152/454, 560, 379.3, 152/380

[56]  References Cited

U.S. PATENT DOCUMENTS

| | | | |
|---|---|---|---|
| 3,814,161 | 6/1974 | Powell et al. ......................... | 152/454 |
| 3,961,657 | 6/1976 | Chrobak ........................... | 152/454 X |
| 4,029,139 | 6/1977 | Abbott ............................. | 152/379.3 |
| 4,343,341 | 8/1982 | Jackson ............................... | 152/454 |
| 4,702,293 | 10/1987 | Iwata et al. ..................... | 152/454 X |

FOREIGN PATENT DOCUMENTS

| | | | |
|---|---|---|---|
| 2846964 | 5/1979 | Fed. Rep. of Germany ...... | 152/454 |
| 59-38102 | 3/1984 | Japan ................................... | 152/454 |

*Primary Examiner*—Michael W. Ball
*Assistant Examiner*—Ramon R. Hoch

[57] ABSTRACT

A tire and wheel rim assembly is described as comprising a tire with low aspect ratio in the range of from 40 to 45 and a wheel rim which has a diameter in the range of from 18 to 20 inches.

6 Claims, 2 Drawing Sheets

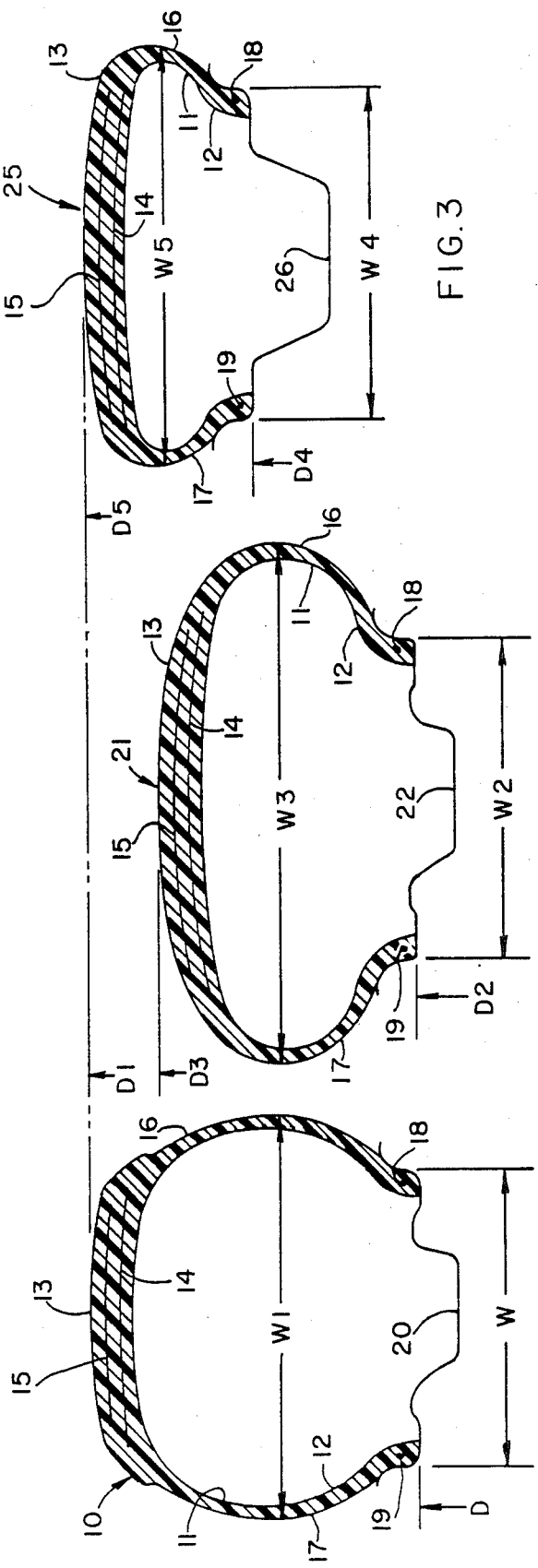

AERODYNAMIC PROFILE TIRE

BACKGROUND OF INVENTION

The invention relates to tires, especially low aspect ratio tires.

Aerodynamics is the present keyword of the automotive industry. As a result, automobiles are sleek and slung low to the ground. Wind resistance is minimized to increase gas mileage. Body shapes are changing to meet the aerodynamic challenge. Yet, tires on which these sleek automobiles ride have not radically changed to keep up with the new body design.

There are basically two different shapes of passenger car tires on the road today: high aspect ratio tires and low aspect ratio tires. The low aspect ratio tires have better cornering characteristics and less rolling resistance than the high aspect ratio tires. However, the low aspect ratio tires have a smaller overall diameter than the high aspect ratio tires and they tend to wear out faster.

An object of this invention is to provide a new tire that will have the advantage of low aspect ratio tires, but will wear longer.

Another object is to provide a new tire that will have a sleeve appearance to match the aerodynamic design changes taking place in automotive styling.

SUMMARY OF THE INVENTION

Briefly stated, the invention is in a special low aspect ratio tire which has a novel overall diameter about equal to that of a tire having a high aspect ratio, e.g. 70-80, to provide a new and different tire which has the advantages of both types of tires. This special tire is used in conjunction with a new, larger diameter wheel rim.

DESCRIPTION OF DRAWING

The following description of the invention will be better understood by having reference to the accompanying drawing, wherein:

FIG. 1 is a section of a conventional high aspect ratio tire on a wheel rim;

FIG. 2 is a section of a conventional low aspect ratio tire on a wheel rim;

FIG. 3 is a section of a tire of the invention on a wheel rim;

ENVIRONMENT OF THE INVENTION

Figure 4:
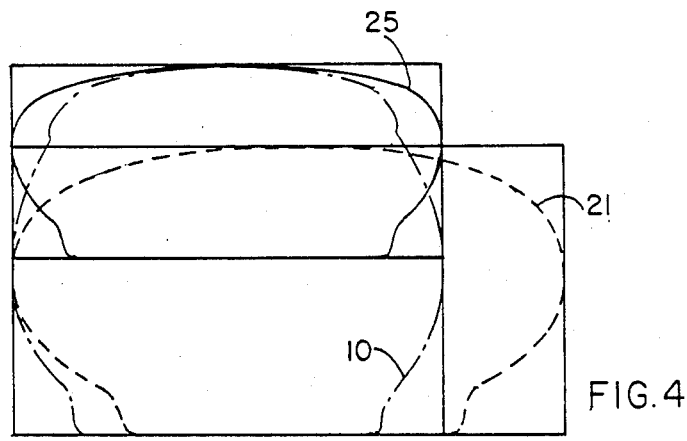
FIG. 4 is a diagram showing the relative shapes and sizes of the tires indicated above.

FIG. 1 shows a section of a conventional P185/80R13 high aspect ratio (HAR) radial tire 10 which comprises the essential components of a fluid impervious innerliner 11, at least one carcass ply 12, a tread 13, a pair of belts 14, 15 between the tread 13 and carcass ply 12, a pair of exposed sidewalls 16, 17 extending from the tread 13 and terminating at a pair of beads 18, 19 which are seated on a conventional wheel rim 20 that has a width W of 5 inches and a diameter D of 13 inches. The HAR tire 10 has an aspect ratio of 80 which is in the normal range of from 70 to 80 for such tires. The overall diameter D1 of the HAR tire 10 is 24.6 inches and the width W1 is 7.2 inches when the tire 10 is properly mounted and inflated on the wheel rim 20.

With reference to FIG. 2, there is shown a conventional P205/60R13 low aspect ratio (LAR) radial tire 21 which has the same essential components indicated above. The LAR tire 21 is mounted on a conventional wheel rim 22 which has a width W2 of 5.5 inches and a diameter D2 of 13 inches. The LAR tire 21 has a width W3 of 8.4 inches and an overall diameter D3 of 22.9 inches, when the tire 21 is properly mounted and inflated on the wheel rim 22.

THE INVENTION

Figure 5:
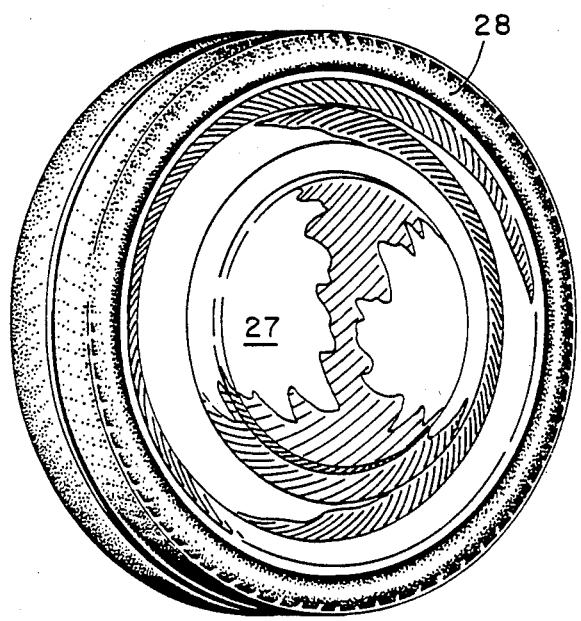
FIG. 5 is a perspective view of a tire of the invention mounted on a new, larger diameter wheel rim equipped with a special, oversized wheel cover, showing the unusual appearance of the tire as it forms a narrow band of rubber extending around the perimeter of the wheel cover.

With reference to FIGS. 3-5, there is shown an aerodynamically profiled (AP) tire 25 which also has the essential components of the other two tires. The AP tire 25, shown in FIG. 3, is a P185/45R18 radial-type tire which is mounted on a special wheel rim 26 which has a width W4 of 5.5 inches and a diameter D4 of 18 inches. As shown in FIG. 3, the beads 18 and 19 fit on the rim 26 and therefore have a heel spacing equal to the width W4 of the rim (5.5 inches) and heel diameter equal to the diameter D4 of the rim (18 inches). The AP tire 25 has a maximum cross-sectional width W5 of 7.2 inches and an overall inflated tread diameter D5 of 24.6 inches when the tire is properly mounted and inflated on the wheel rim 26.

The tire 25 is normally inflated to about 50 p.s.i., a much higher air pressure than either the HAR tire 10 or the LAR tire 21, which are inflated to about 30 p.s.i. It can be appreciated from a comparison of FIGS. 2 and 3 that the height of the inflated AP tire 25 (D5 minus D4) is 6.6 inches, or over 3 inches less than the similarly measured height of the inflated LAR tire 21 which has a height of 9.9 inches (D3 minus D2). The sidewalls 16, 17 of the AP tire 25 are short and rigid to provide potential run flat resistance, especially when compared with the longer sidewalls of the LAR tire 21 and the even larger HAR tire 10.

Because of its low aspect ratio, the AP tire 25 has better cornering characteristics and less rolling resistance than the HAR tire 10. Yet, the tread 13 of the AP tire 25 will wear longer than the LAR tire 21 because of its larger diameter D5.

In the AP tire 25, the aspect ratio of the tire is, by definition, as follows:

$$\text{Aspect ratio} = \frac{(D5 - D4)/2}{W5} \times 100$$

where D4, D5 and W5 are the dimensions indicated in FIG. 3. When this aspect ratio of the tire 25 is divided by the nominal rim/bead heel diameter D4, the result should be in the range of from 1.8 to 2.8. Further, the ratio of the rim diameter D4 to the rim width W4 should be in the range of from 2.5 to 3.5 to make a good workable rim 26 for the AP tire 25.

An HAR tire 10 has an aspect ratio which is normally in the range of from 70 to 80 and is mounted on 13, 14 or 15 inch wheel rims 20, whereas an LAR tire 21 has an aspect ratio in the range of from 50 to 60 and is mounted on 13, 14 or 15 inch diameter wheel rims 22. An AP tire 25 has an aspect ratio in the low range of from 40 to 45 and is mounted on 18, 19 or 20 inch diameter wheel rims 26.

The AP tire 25 has a sleek, stylish look especially when a fanciful wheel cover 27 (FIG. 5) is used. The large chrome wheel cover 27 and surrounding narrow black band of rubber tire provide a unique, advanced design which fits with the sleek, aerodynamic automobile bodies that are being produced by the car makers.

The block diagram of FIG. 4, representing the sections of the tires 10, 21, 25 is provided to give a better understanding of the differences in the size and shape of the tires 10, 21, 25 mentioned above. The small size of the AR tire 25 can be readily appreciated.

Another advantage of the AP tire 25 is the larger wheel rim 26 which provides greater space for the brake drum and new opportunities for wheel rim and wheel cover design.

Thus, the novel tire of the present invention has a very low aspect ratio but its larger than normal bead diameter results in an overall diameter equivalent to high aspect ratio tires. The cornering and rolling resistance advantages of low aspect ratio tires are therefore combined with the wear rate advantage of high aspect ratio tires. Also, the larger than normal wheel rim assembly aesthetically emphasizes the wheel rim while reducing the tire size to provide an unusual, advanced design that matches the sleek, stylish automobile bodies that are being designed for the future.

We claim:

1. An inflatable tire having a low aspect ratio in the range of from 40 to 45, a bead heel diameter (D4) in the range of from 18 to 20 inches, and a ratio of bead heel diameter (D4) to bead heel spacing (W4) in the range of from 2.5 to 3.5.

2. The wire of claim 1 wherein the overall inflated tread diameter (D5) is about 6.6 inches greater than the bead heel diameter (D4) and the maximum cross-sectional tire width (W5) is about 7.2 inches.

3. The tire of claim 1, wherein the tire is a radial tire.

4. A tire and wheel assembly, comprising:
   (a) a wheel rim which has a diameter (D4) that is in the range of 18 to 20 inches;
   (b) a tire mounted on the wheel rim having an aspect ratio in the range of from 40 to 45, and a ratio of bead heel diameter (D4) to bead heel spacing (W4) in the range of 2.5 to 3.5.

5. The tire and wheel assembly of claim 3 wherein the overall inflated tread diameter (D5) is about 6.6 inches greater than the bead heel diameter (D4) and the maximum cross-sectional tire width (W5) is about 7.2 inches.

6. The tire and wheel assembly of claim 3, wherein the tire is a radial tire.

* * * * *